United States Patent
He et al.

(10) Patent No.: US 11,543,499 B2
(45) Date of Patent: Jan. 3, 2023

(54) HYBRID REFRACTIVE GRADIENT-INDEX OPTICS FOR TIME-OF-FLY SENSORS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 594 days.

(21) Appl. No.: 16/721,941

(22) Filed: Dec. 20, 2019

(65) Prior Publication Data

US 2021/0191009 A1 Jun. 24, 2021

(51) Int. Cl.

| | |
|---|---|
| *G01S 7/4865* | (2020.01) |
| *G02B 5/08* | (2006.01) |
| *G02B 3/00* | (2006.01) |
| *G01S 17/00* | (2020.01) |
| *G01C 3/10* | (2006.01) |
| *G01C 3/24* | (2006.01) |
| *G01S 17/48* | (2006.01) |

(Continued)

(52) U.S. Cl.
CPC .............. *G01S 7/4865* (2013.01); *G01C 3/10* (2013.01); *G01C 3/24* (2013.01); *G01S 17/006* (2013.01); *G01S 17/48* (2013.01); *G02B 3/0087* (2013.01); *G02B 5/0883* (2013.01); *G01S 17/894* (2020.01); *G02B 27/30* (2013.01)

(58) Field of Classification Search
CPC ...... G01S 7/4865; G01S 17/006; G01S 17/48; G01S 17/894; G02B 27/30; G02B 5/0883; G02B 3/0087; G01C 3/24; G01C 3/10

See application file for complete search history.

(56) References Cited

U.S. PATENT DOCUMENTS

| | | | |
|---|---|---|---|
| 2004/0032669 A1* | 2/2004 | Trotter, Jr. | ........... G02B 3/0087 359/653 |
| 2018/0031704 A1 | 2/2018 | Lepere et al. | |

FOREIGN PATENT DOCUMENTS

| | | |
|---|---|---|
| CN | 101470251 A | 7/2009 |
| CN | 106716240 A | 5/2017 |

(Continued)

*Primary Examiner* — Georgia Y Epps
*Assistant Examiner* — Don J Williams
(74) *Attorney, Agent, or Firm* — Kilpatrick Townsend & Stockton LLP (57) ABSTRACT

Techniques are described for time-of-fly sensors with hybrid refractive gradient-index optics. Some embodiments are for integration into portable electronic devices with cameras, such as smart phones. For example, a time-of-fly (TOF) imaging subsystem can receive optical information along an optical path at an imaging plane. A hybrid lens can be coupled with the TOF imaging subsystem and disposed in the optical path so that the imaging plane is substantially at a focal plane of the hybrid lens. The hybrid lens can include a less-than-quarter-pitch gradient index (GRIN) lens portion, and a refractive lens portion with a convex optical interface. The portions of the hybrid lens, together, produce a combined focal length that defines the focal plane. The hybrid lens is designed so that the combined focal length is less than a quarter-pitch focal length of the GRIN lens portion and has less spherical aberration than either lens portion.

20 Claims, 8 Drawing Sheets

(51) Int. Cl.
　　　*G02B 27/30*　　　(2006.01)
　　　*G01S 17/894*　　(2020.01)

(56) References Cited

FOREIGN PATENT DOCUMENTS

| CN | 107615132 A | 1/2018 |
| CN | 109031247 A | 12/2018 |

* cited by examiner

HYBRID REFRACTIVE GRADIENT-INDEX OPTICS FOR TIME-OF-FLY SENSORS

FIELD

The invention relates generally to optics integrated into personal electronic devices. More particularly, embodiments relate to hybrid refractive gradient-index optics for time-of-fly sensors for integration into portable personal electronic device environments, such as for use with cameras in smart phones.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture moments using their smartphones. Advances in digital photography have included advances in capturing of three-dimensional information for various purposes. For example, capturing of depth and other three-dimensional information can support three-dimensional photography and videography, as well as advanced automation in focus, stabilization, aberration correction, and other features.

In some photographic applications, depth information can be captured using various time-of-fly techniques. For example, focused light pulses can be transmitted, and their reflections can be subsequently received; and knowledge of various parameters (e.g., the speed of light) can be used to convert pulse receipt timing into a depth measurement. Conventionally, it has been difficult to integrate such time-of-fly techniques in portable digital electronics applications, such as smart phones. For example, some conventional approaches rely on relatively large optics and/or specialized illumination sources that do not fit within spatial limitations of many portable digital electronic applications; while other conventional approaches tend not to be reliable or accurate enough to support more advanced features.

BRIEF SUMMARY OF THE INVENTION

Embodiments provide time-of-fly sensors with hybrid refractive gradient-index optics. Some embodiments are for integration into portable electronic devices with cameras, such as smart phones. For example, a time-of-fly (TOF) imaging subsystem can receive optical information along an optical path at an imaging plane. A hybrid lens can be coupled with the TOF imaging subsystem and disposed in the optical path so that the imaging plane is substantially at a focal plane of the hybrid lens. The hybrid lens can include a less-than-quarter-pitch gradient index (GRIN) lens portion, and a refractive lens portion with a convex optical interface. The portions of the hybrid lens, together, produce a combined focal length that defines the focal plane. The hybrid lens is designed so that the combined focal length is less than a quarter-pitch focal length of the GRIN lens portion and has less refractive aberration than either lens portion.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Increasingly, digital imaging is exploiting depth information to support various features. For example, in three-dimensional computer graphics, depth maps are used to indicates information relating to the distance of the surfaces of scene objects from a viewpoint. Similarly, in digital photography, depth mapping, and the like, can be used to support three-dimensional image capture features, enhanced auto-focusing features, and other features. Various techniques are generally known for acquiring such depth information, such as so-called "time-of-fly" (TOF) techniques. TOF techniques generally measure a distance of an object with respect to a reference point by emitting light beams towards an object, and measuring timing of reflections of the emitted light. For example, light is emitted towards an object at t1, reflected light from the object is captured at time t2, and a time difference between t1 and t2 is calculated. Because the speed of light is known, the distance of the object with respect to a reference point can be derived based on time difference.

Such techniques can have various limitations. One such limitation is that a single illumination source is typically pointed in a single direction and produces a single reflection, such that a single illumination source yields a distance measurement only of a single point (or area) on a single object in the scene. Producing more measurements (e.g., a depth map) can involve changing the directions of one or more light sources (e.g., in a scanline fashion) to obtain and compile information for multiple reflections. Such approaches can be inefficient and time consuming. Some TOF approaches seek increased efficiency by using a TOF detector array (e.g., to collect multiple depth data points at a time). However, the performance of such arrays conventionally tends to be highly affected by background light strength, target surface reflection, and/or other conditions.

One innovative type of TOF sensor measures a distance of an object by using a first light source and a second light source to emit first light and a second light toward an object to illuminate the object. The emission of the first light and second light can be configured such that the two lights converge at a first point and diverge at a second point. An optical sensor can be used to capture a first image of the object illuminated by the first light, and capture a second image of the object illuminated by the second light. An image difference between the first image and the second image of the object can be determined. The distance of the object with respect to the first point can then be determined based on the image difference and a distance difference between the first point and the second point. Various implementations of such sensors can include additional features. For example, a collimator can be configured to cause the first light and the second light to completely overlap the first point, so that the determined image difference can indicate a level of overlap between the first light and the second light at a given point between the first and second points. Additionally or alternatively, a light beam structure mask can be used to structure the first light and the structure the second light to include a set of sub-light-spots, such that each sub-light spot in the structured first light corresponds to a sub-light spot in the structured second light. For example, determining the image difference between the first image and the second image of the object can include comparing a position of a sub-light-spot in the structured first light and a position of a corresponding sub-light-spot in the structured second light, and an overlap level between the first light and the second light at the given point can be determined based on the image difference. Some embodiments of such a TOF sensor are described in U.S. Pat. No. 10,489,925, titled "3D Sensing Technology Based on Multiple Structured Illumination, which is hereby incorporated by reference in its entirety.

In some of these and other TOF sensors, performance can be improved by using optics to focus the reflected light onto the TOF imaging elements. However, such optics tend to be difficult to incorporate into typical form factors of many portable electronic device applications. To illustrate one difficulty, a lens may be characterized by an "f-number" ("F #"), which is a dimensionless measurement of a ratio between the focal length of the lens to the diameter of its aperture. Such TOF applications (e.g., in portable electronics) typically use low-power illumination sources, resulting in dim reflections. As such, reliable detection can involve letting in as much light as possible to the detector elements. However, for a lens with a particular F-number, increasing the effective aperture diameter (e.g., to let in more light for improved detection) can also proportionally increase the focal length of the lens do to the reciprocal relationship; which can tend to increase the effective footprint of the lens assembly.

Further, some lenses, such as small refractive lenses (e.g., convex lenses) can often be difficult to mount and/or control in small form factors, and they may manifest one or more types of optical aberration. Newer types of lenses, such as gradient-index (GRIN) lenses can be easier to mount but have other limitations. For example, such GRIN lenses tend to have relatively large negative spherical aberration and are conventionally too large for use in such TOF applications. For example, achieving quarter-pitch focusing in a conventional GRIN lens for a smart phone type of TOF application may involve using a GRIN lens of around five millimeters or more, which may be too long for many such applications.

Embodiments described herein include a novel hybrid lens that includes a GRIN lens portion and a refractive lens portion. For example, a time-of-fly (TOF) imaging subsystem can receive optical information along an optical path at an imaging plane. A hybrid lens can be coupled with the TOF imaging subsystem and disposed in the optical path so that the imaging plane is substantially at a focal plane of the hybrid lens. The hybrid lens can include a less-than-quarter-pitch gradient index (GRIN) lens portion, and a refractive lens portion with a convex optical interface. The portions of the hybrid lens, together, produce a combined focal length that defines the focal plane. The hybrid lens is designed so that the combined focal length is less than a quarter-pitch focal length of the GRIN lens portion and has less spherical aberration than either lens portion.

Figure 1A:
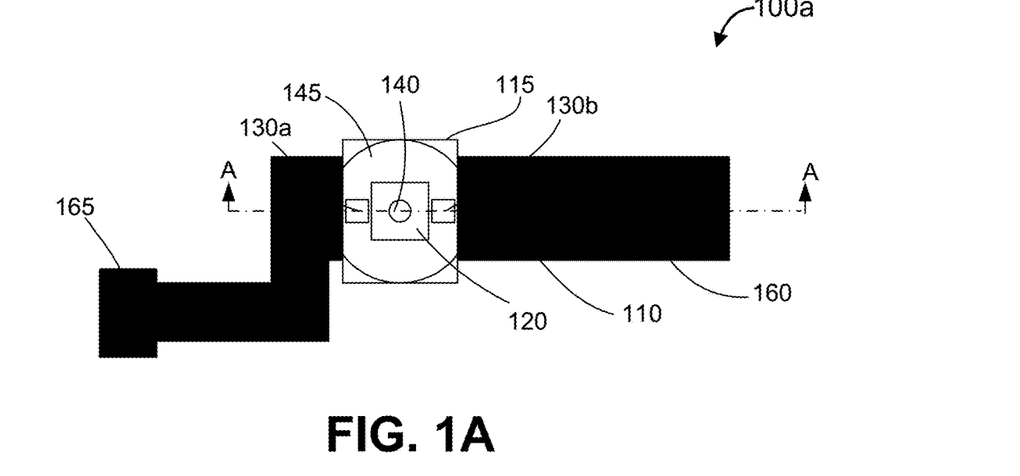
FIG. 1A-1C shows different views of an illustrative time-of-fly (TOF) sensor system that includes a hybrid refractive gradient-index (GRIN) lens, according to various embodiments.
Figure 1B:
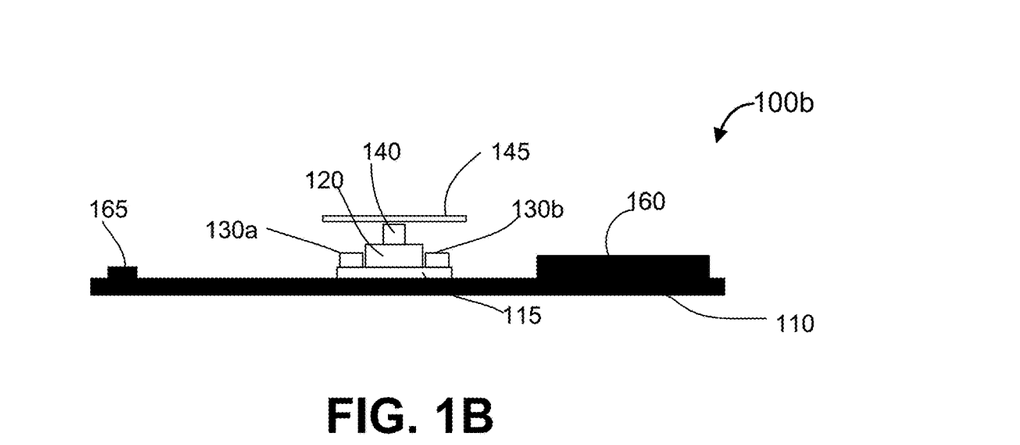
Figure 1C:
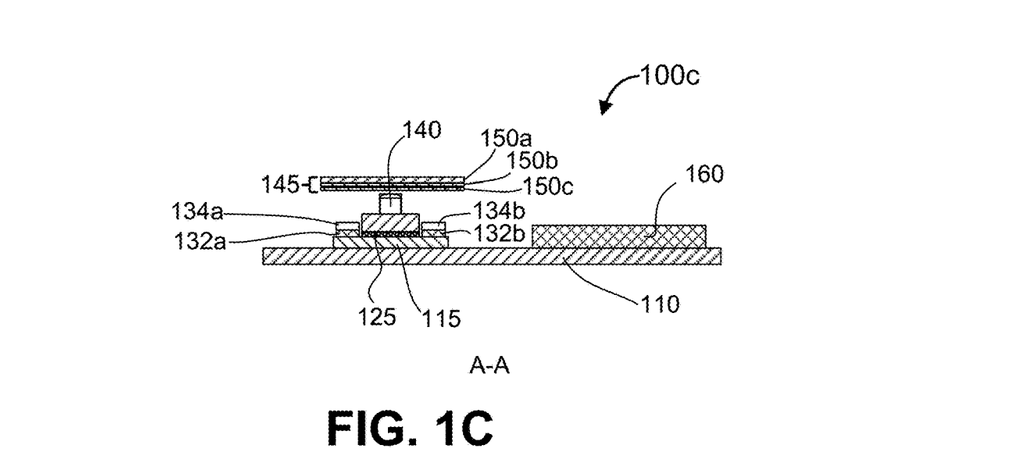

Turning to FIG. 1A-1C, different views are shown of an illustrative time-of-fly (TOF) sensor system 100 that includes a hybrid refractive GRIN lens, according to various embodiments. FIG. 1A shows a top view of the illustrative TOF sensor system 100, FIG. 1B shows a side view of the illustrative TOF sensor system 100 of FIG. 1A. FIG. 1C shows a cross-sectional view of the illustrative TOF sensor system 100 cut along section A shown in FIG. 1A. As illustrated, the illustrative TOF sensor system 100 includes a substrate 110, such as a circuit board. Various portions of the illustrative TOF sensor system 100 can be mounted on the substrate 110. For example, the substrate 110 can have, mounted thereon, a TOF sensor module (e.g., including a TOF sensor driving board 115 and supporting optics and other components for TOF illumination and receiving), circuit blocks 160 to support operation of the TOF sensor system 100, and a connector 165 to support integration of the TOF sensor system 100 into other systems (e.g., a portable electronic device).

Components of the TOF sensor system 100 can be coupled with the substrate 110 via a TOF sensor driving board 115, or any other suitable circuitry and/or structure. In general, the TOF sensor system 100 includes components to project illumination on objects in a scene and to receive and process optical information based on reflections of the illumination off of the objects. As illustrated, the TOF sensor system 100 can include an illumination subsystem that includes a set of illumination sources 130. Each illumination source 130 can be any suitable probe light source. In some implementations, as illustrated in FIG. 1C, each illumination source 130 can include a light emitter 132 and a light handler 134. Though only two illumination sources 130a and 130b are shown, any suitable number of illumination sources 130 can be used.

The illumination from the illumination sources 130 can be projected through one or more cover layers 145, and reflections from objects in the scene can be received through the one or more cover layers 145. The cover layers 145 can include any suitable number of layers of any suitable material, for example, to provide various optical effect. For example, the cover layers 145 can include a window material layer 150a, such as a transparent glass layer. In some implementations, the cover layers 145 can also include any suitable optical filters 150b, optical polarizers 150c, and/or the like. Such layers can help reduce influences of other wavelengths (e.g., from ambient lighting, and/or other lighting sources) on detection of the reflections.

The reflected light can be received (e.g., via the cover layers 145) by the TOF optical receiving module 120 along an optical path. The TOF optical receiving module 120 can include any suitable optical detection elements 125 (e.g., a photodiode array). As described herein, embodiments include a novel hybrid refractive GRIN lens 140 in the optical path to facilitate receipt of the reflected optical information along the optical path by the TOF optical receiving module 120 (by the optical detection elements 125). For example, the hybrid refractive GRIN lens 140 is configured to have a relatively large effective aperture to thereby receive a large amount of light, while also being configured to focus the received illumination onto the optical detection elements 125. Embodiments can also be configured for reduced aberration, such as reduced spherical aberration, reduced coma aberration, reduced optical distortion, etc.

Figure 2:
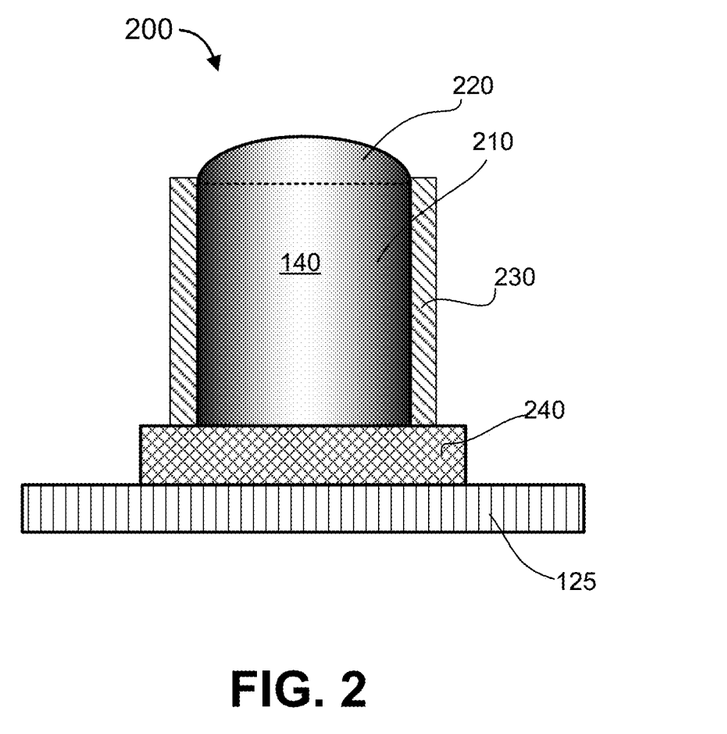
FIG. 2 shows an illustrative partial TOF optical receiving module having an hybrid refractive GRIN lens, according to various embodiments.

FIG. 2 shows an illustrative partial TOF optical receiving module 200 having an hybrid refractive gradient-index (GRIN) lens 140, according to various embodiments. As illustrated, the hybrid refractive GRIN lens 140 includes a GRIN lens portion 210 and a refractive lens portion 220. The hybrid refractive GRIN lens 140 can be housed within a lens housing structure 230. The lens housing structure 230 can be configured to secure the hybrid refractive GRIN lens 140 and/or other components (e.g., the lens pad 240). In some embodiments, the lens housing structure 230 is made of a material, coated, or otherwise configured to reduce internal reflection at inner wall surfaces of the hybrid refractive GRIN lens 140 (e.g., in the GRIN lens portion 210). In some implementations, the lens housing structure 230 is used to help position and/or secure the hybrid refractive GRIN lens 140 relative to the optical detection elements 125.

In some embodiments, the partial TOF optical receiving module 200 further includes a lens pad 240. The lens pad 240 can include any one or more components and/or materials to provide additional optical features. In some implementations, the lens pad 240 includes an air gap and/or adhesive, for example, to facilitate precise alignment and/or securing of a focal plane of the hybrid refractive GRIN lens 140 with an imaging plane defined by the optical detection elements 125. In other implementations, the lens pad 240 can include one or more optical components to optimize characteristics of the hybrid refractive GRIN lens 140. For example, the components can be shaped or otherwise configured to reduce certain types of aberration and/or distortion.

The hybrid refractive GRIN lens 140 can be produced in any suitable manner. In some embodiments, the GRIN lens portion 210 is produced as one or more discrete segments of GRIN lens material having one or more particular lengths. The segments of GRIN lens material can be generally cylindrical with flat end surfaces. In such embodiments, the refractive lens portion 220 can similarly be produced as one or more discrete refractive lenses, such as half-convex lenses (i.e., for which one surface is flat and the opposite surface is curved). As used herein, a "refractive" lens is intended broadly to include any lenses that refract at least because of a curved surface, such as spherical lenses, aspherical lenses, compound lenses (e.g., made of combinations of spherical and/or aspherical lenses), etc. Notably, while a GRIN lens does refract light, use of the terms "refractive lens," "refractive lens portion," and the like are intended to be differentiated from the GRIN lens, GRIN lens portion, or the like described herein. In such embodiments, the discrete GRIN lens portion 210 can be affixed to the discrete refractive lens portion 220. In one implementation, the GRIN lens portion 210 and the refractive lens portion 220 can be secured within a holding structure (e.g., lens housing 230) in a manner that maintains a desired optical coupling between the lens portions. In another implementation, the refractive lens portion 220 is adhered to the GRIN lens portion 210 using an adhesive with desired optical properties. For example, embodiments can use a thin layer of transparent adhesive of substantially consistent thickness. In other embodiments, the GRIN lens portion 210 and the refractive lens portion 220 are produced as a unitary structure. In some such embodiments, a segment of GIN lens material is shaped (at least at one end) to form a refractive surface contour with properties of a refractive refractive lens. In such embodiments, both the GRIN lens portion 210 and the refractive lens portion 220 can be produced from the same unitary segment of GRIN lens material.

GRIN lenses generally refer in the art to a class of lenses made of a material having a gradient in the index of refraction throughout at least part of the material. Typically, in a GRIN lens, the index of refraction varies as a function (e.g., as a parabolic function) of a radial distance from the center of the material. As such, the GRIN lens can be designed to refract light in a similar fashion to that of a traditional refractive (e.g., convex) lens, though with certain different characteristics. One characteristic is that, unlike a traditional refractive lens, GRIN lenses tend to have flat input and output surfaces, which can tend to facilitate mounting and integration with other optics. Another characteristic is that GRIN lenses tend to have negative spherical aberration (conventional refractive convex lenses tend to have positive spherical aberration). Another characteristic is that GRIN lenses can have an F-number of less than 1 (i.e., a larger effective aperture diameter than focal length), which can be difficult to accomplish with conventional refractive (e.g., refractive) lenses. GRIN lenses can also tend to have relatively low optical distortion and a relatively wide working bandwidth (e.g., from ultraviolet to infrared).

Figure 3:
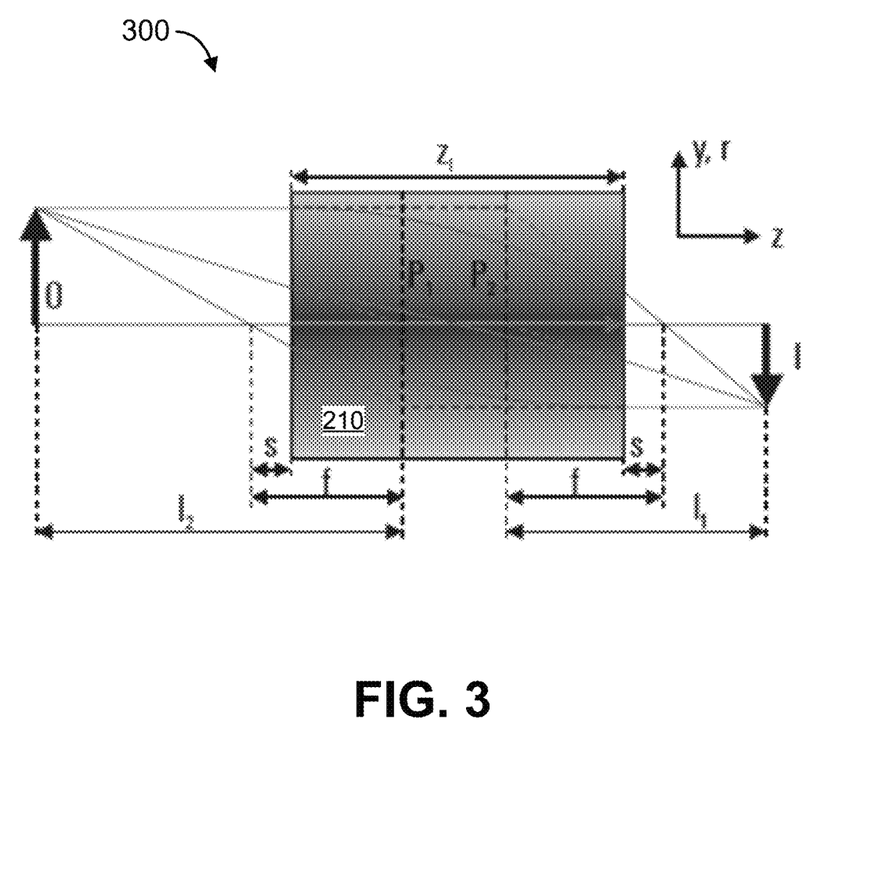
FIG. 3 shows an operational representation of a GRIN material segment, such as for use in forming an illustrative GRIN lens portion of a hybrid refractive GRIN lens described herein.

For added clarity, FIG. 3 shows an operational representation 300 of a GRIN material segment, such as for use in forming an illustrative GRIN lens portion 210 of a hybrid refractive GRIN lens 140 described herein. As illustrated, GRIN lens performance can depend on a continuous change of the refractive index within the lens material. For example, the refractive index can reach a highest magnitude on the optical axis and lowest on the lens side surface (e.g., following a parabolic shape). Assuming the geometrical gradient constant is g, the GRIN focal length $f_G$ and the working distance s of a GRIN lens can be computed as:

$$f_G = \frac{1}{n_0} g \, \sin(gZ_l), \text{ and}$$

$$s = \frac{1}{n_0} g \, \tan(gZ_l).$$

Because of these geometric relationships, the length of the GRIN lens ($Z_l$) impacts the focal length and the effective working distance of the lens. Light rays passing through the GRIN lens material tend to follow a sinusoidal path, such that the GRIN lens length is commonly referred to in terms of "pitch." In a "full pitch" lens, the GRIN lens length is controlled so that $gZ_l$ equals $\pi$. By controlling the GRIN lens length so that $gZ_l$ equals $\pi/2$ (so-called "quarter-pitch"), the focal plane of the lens is effectively at its end surface (i.e., when $gZ_l$ equals $\pi/2$, the tangent thereof equals zero, placing s in the equation above at a zero distance from the end of the GRIN lens).

To date, GRIN lenses have not been used in TOF sensor applications for various reasons. One reason is that the negative spherical aberration of the GRIN lens may reduce detection effectiveness. Another reason is that, while a quarter-pitch GRIN lens can be used to focus received light onto the imaging plane of the TOF optical receiving module 120, a typical quarter-pitch GRIN lens may be too large for certain applications. For example, a quarter-pitch GRIN lens may be approximately five millimeters long, which may be too long for effective integration into many typical portable electronic device applications. As can be seen from the equations above, reducing the length of the GRIN lens increases the focal length and working distance of the lens, which effectively counteracts the decrease in lens length.

As described herein, the hybrid refractive GRIN lens 140 incorporates the GRIN lens portion 210 with the refractive lens portion 220 in a particular manner to produce novel synergistic optical effects. In particular, embodiments of the GRIN lens portion 210 are produced to have a GRIN lens length of less than a quarter pitch. In one implementation, the GRIN lens portion 210 is produced with a lens length corresponding approximately to ⅛ pitch (i.e., $\pi/4$). In other implementations, the GRIN lens portion 210 is produced with a lens length falling between approximately ⅙ pitch and ¹⁄₁₀ pitch. As the length of the GRIN lens portion 210 decreases, its focal length increases and its negative spherical aberration tends to decrease in magnitude (i.e., it becomes closer to zero). Embodiments of the refractive lens portion 220 are designed to have a particular focal length and positive spherical aberration.

In some implementations, the focal length of the refractive lens portion 220 is substantially matched to that of the GRIN lens portion 210. The combined (hybrid) focal length ($f_H$) of the GRIN lens portion 210 and the refractive lens portion 220 can be described as:

$$f_H = \frac{f_G f_S}{f_G + f_S}$$

where $f_G$ is the focal length of the GRIN lens portion 210, and fs is the focal length of the refractive lens portion 220. For the sake of illustration, referring to the formula above for $f_G$, it can be seen that halving the GRIN lens length (e.g., changing from a quarter-pitch to an eighth-pitch lens) increases the focal length by the square root of two ($\sqrt{2}$). For example, if the quarter-pitch GRIN focal length is $f_{G0}$, the eighth-pitch GRIN focal length is approximately 1.4 times $f_{G0}$. For ease of references, the phrase "quarter-pitch focal length" (or similar) is used herein to refer to what the focal length of the GRIN lens portion would be if it were sized with a length corresponding to a quarter pitch. If the focal length of the refractive lens portion 220 is matched (also to approximately 1.4 times $f_{G0}$), the approximate hybrid focal length can be derived as:

$$f_H = \frac{f_G f_S}{f_G + f_S} = \frac{(\sqrt{2} * f_{G0})^2}{2(\sqrt{2} * f_{G0})} = \frac{f_{G0}}{\sqrt{2}}$$

As can be seen, the hybrid focal length is less than the focal lengths of either of the GRIN lens portion 210 or the refractive lens portion 220 alone, and is even appreciably reduced from the quarter-pitch focal length of the GRIN lens portion 210 itself (e.g., reduced by about 30 percent in this example). Further, suppose the quarter-pitch F-number for the GRIN lens portion 210 is approximately 0.95. Without physically changing the diameter of the GRIN lens aperture, the F-number also increases. This change in F-number can manifest as an appreciable increase in apparent aperture diameter, such that more light is effectively received by the hybrid refractive GRIN lens 140 than would be received by the GRIN lens portion 210 itself. For example, if the original natural aperture was 0.5, the above change in focal length can effectively increase the natural aperture to approximately 0.74.

FIGS. 4A-4F show a number of illustrative optical configurations of hybrid refractive GRIN lenses 400, according to various embodiments. As described above, each illustrated hybrid refractive GRIN lens 400 includes a GRIN lens portion 210 and a refractive lens portion 220. In general, the hybrid refractive GRIN lens 400 receives light rays 420, including light reflected from objects in a surrounding scene after projecting illumination onto those objects by one or more illumination sources (e.g., illumination sources 130). The hybrid refractive GRIN lens 400 focuses the received light rays 420 on a hybrid focal plane 410. As described above, the hybrid focal plane 410 is defined by the integration of focal planes of the GRIN lens portion 210 and the refractive lens portion 220. In general, it is desirable to configure the hybrid refractive GRIN lens 400 so that the hybrid focal plane 410 is located substantially at an imaging plane on which lies the optical detection elements 125, such as a substantially planar photodiode array. As illustrated by the different configurations of FIGS. 4A-4F, such positioning of the hybrid focal plane 410 may or may not result in the hybrid focal plane 410 being at an output end of the GRIN lens portion 210, or even of the hybrid refractive GRIN lens 400.

Figure 4A:
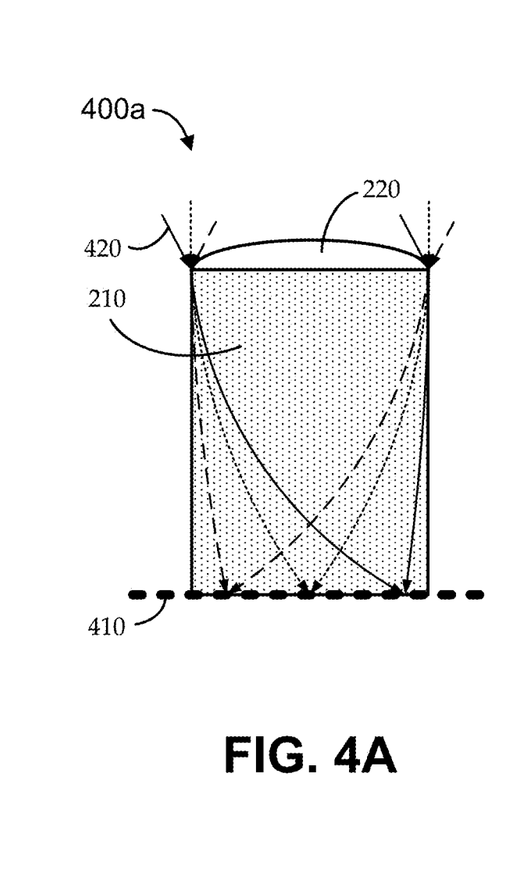
FIGS. 4A-4F show a number of illustrative optical configurations of hybrid refractive GRIN lenses, according to various embodiments.
Figure 4B:
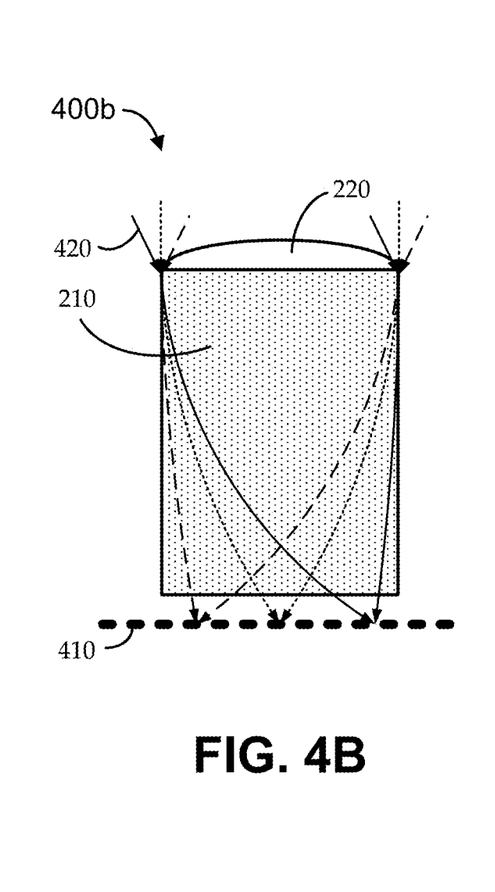
Figure 4C:
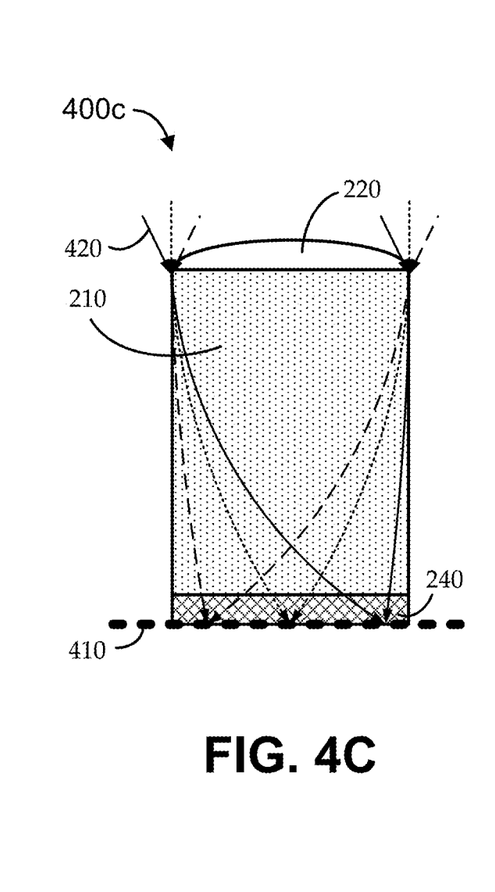

In FIGS. 4A-4C, the hybrid refractive GRIN lens 400 is oriented so that the refractive lens portion 220 is away from the hybrid focal plane 410, and the GRIN lens portion 210 is toward the hybrid focal plane 410. In FIG. 4A, the hybrid refractive GRIN lens 400a is configured so that the hybrid focal plane 410 is substantially at a flat output face of the GRIN lens portion 210. Such a configuration can be used, for example, where the flat output face of the GRIN lens portion 210 is placed in direct contact with a plane of optical detection elements 125 (e.g., or separated only with a very thin adhesive or other layer). In FIG. 4B, the hybrid refractive GRIN lens 400b is configured so that the hybrid focal plane 410 is beyond the flat output face of the GRIN lens portion 210. Such a configuration can be used, for example, where a precise or adjustable air gap is used to focus the output of the GRIN lens portion 210 onto the plane of optical detection elements 125, where it is otherwise undesirable for the GRIN lens portion 210 to directly contact the optical detection elements 125. In FIG. 4C, the hybrid refractive GRIN lens 400c is configured so that the hybrid focal plane 410 is beyond the flat output face of the GRIN lens portion 210, as in FIG. 4B, and a lens pad 240 is disposed at the output face of the GRIN lens portion 210. For example, the GRIN lens portion 210 is sandwiched between the output face of the GRIN lens portion 210 and the optical detection elements 125. As described herein, such a configuration can be used to exploit certain features of the lens pad 240 and/or to separate the output of the GRIN lens portion 210 from the optical detection elements 125. For example, providing an air gap as in FIG. 4B can add coma aberration or other artifacts to the optical path, and use of a lens pad 240 can provide a similar installation gap without introducing (or even correcting) such artifacts.

Figure 4D:
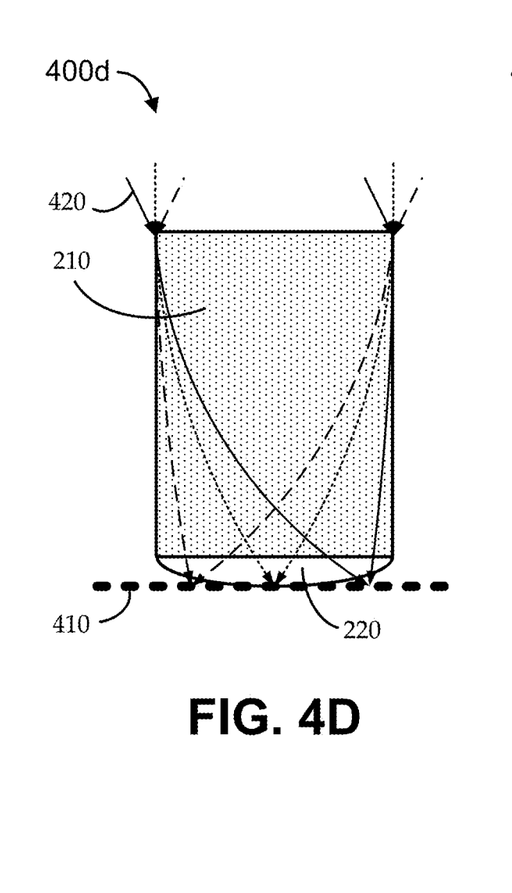
Figure 4E:
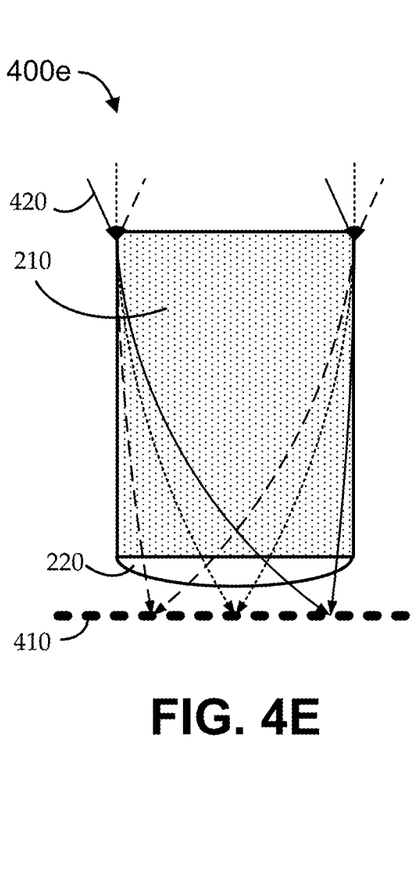
Figure 4F:
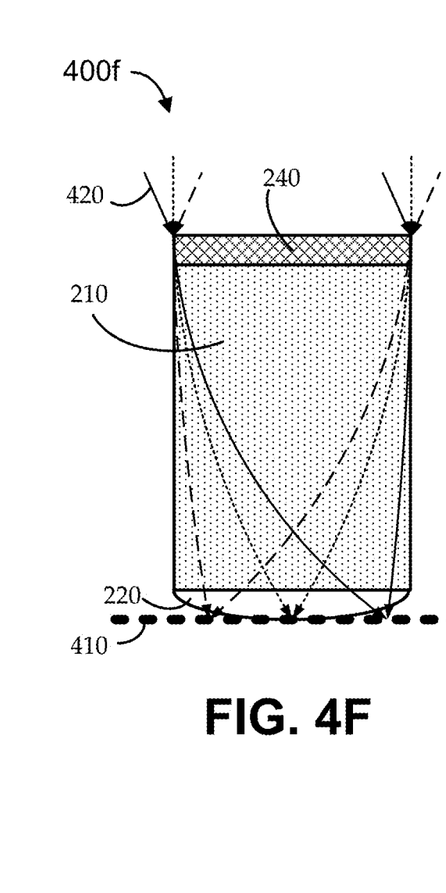

In FIGS. 4D-4F, the hybrid refractive GRIN lens 400 is oriented so that the refractive lens portion 220 is toward the hybrid focal plane 410, and the GRIN lens portion 210 is away from the hybrid focal plane 410. In some implementations, orienting the refractive lens portion 220 toward the hybrid focal plane 410 can locate the exit pupil in a manner that can tend to even further reduce the effective focal length (e.g., and F-number) of the hybrid refractive GRIN lens 400. In FIG. 4D, the hybrid refractive GRIN lens 400d is configured so that the hybrid focal plane 410 is substantially at the curved output face of the refractive lens portion 220. In FIG. 4E, the hybrid refractive GRIN lens 400e is configured so that the hybrid focal plane 410 is beyond the curved output face of the refractive lens portion 220. Such a configuration can be used, for example, where a precise or adjustable air gap is used to focus the output of the hybrid refractive GRIN lens 400e onto the plane of optical detection elements 125, where it is otherwise undesirable for the hybrid refractive GRIN lens 400e to directly contact the optical detection elements 125. In FIG. 4F, the hybrid refractive GRIN lens 400f is configured so that the hybrid focal plane 410 is substantially at the curved output face of the refractive lens portion 220, as in FIG. 4D, and a lens pad 240 is disposed at the input face of the GRIN lens portion 210.

As discussed above, synergistic effects can be achieved by integrating GRIN lens portions 210 and refractive lens portions 220 into hybrid refractive GRIN lenses, as described herein. One feature of this integration is the reduction in effective focal length with a reduction in lens length. As described above, this can also produce an effective increase in F-number and natural aperture, thereby increasing the amount of light being received for detection. In addition to the features discussed above, the integration of the refractive lens portion 220 with the GRIN lens portion 210 can also appreciably reduce (e.g., or even substantially eliminate) spherical aberration. The GRIN lens portion 210 tends to manifest negative spherical aberration, and the refractive lens portion 220 tends to manifest positive spherical aberration. The hybrid refractive GRIN lens 140 can be configured so that the positive spherical aberration caused by the refractive lens portion 220 partially or completely counteracts the negative spherical aberration caused by the GRIN lens portion 210.

In some embodiments, these and other features can be expanded and/or further optimized by using multiple sub-components. In some embodiments, the GRIN lens portion 210 can be comprised of multiple sub-portions and/or the refractive lens portion 220 can be comprised of multiple sub-portions to further optimize such features (e.g., to provide additional impacts to focal length, aperture, aberration, etc.). Further, as described herein, some embodiments use a lens pad 240 to provide additional optical features. For example, integration of the refractive lens portion 220 may introduce additional aberrations or distortions, and the lens pad 240 can be configured to counteract those aberrations or distortions.

Figure 5:
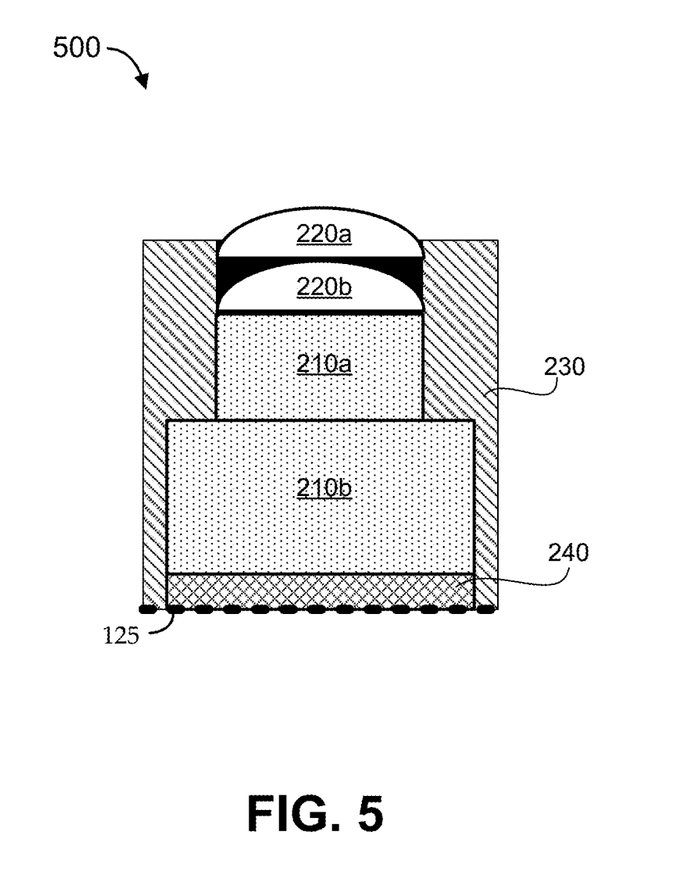
FIG. 5 shows an illustrative partial TOF optical receiving module having a hybrid refractive GRIN lens with multiple sub-portions, according to various embodiments.

FIG. 5 shows an illustrative partial TOF optical receiving module 500 having a hybrid refractive gradient-index (GRIN) lens with multiple sub-portions, according to various embodiments. As illustrated, the hybrid refractive GRIN lens includes first and second GRIN lens portions 210 and first and second refractive lens portions 220. For the sake of clarity and context, the hybrid refractive GRIN lens is shown housed within a lens housing structure 230, including a lens pad 240, and being integrated with an imaging plane defined by optical detection elements 125. Each sub-portion of the hybrid refractive GRIN lens can provide a particular feature. In one implementation, the first GRIN lens portion 210a (i.e., the first sub-portion of the GRIN lens portion 210) has a smaller diameter than that of the second GRIN lens portion 210b. Such a configuration can help preserve (e.g., focus) some of the optical information at the edges of the first GRIN lens portion 210a for detection. Additionally or alternatively, multiple GRIN lens sub-portions can be used to provide other features, such as by producing each sub-portion with different materials, diffusions, and/or other characteristics to result in different gradients of refraction index across the different sub-portions, different aberration characteristics in the different sub-portions, etc. Similarly, different refractive lens sub-portions can be used to provide different characteristics, or for any other suitable purpose. For example, the refractive lens portion 220 can be composed of multiple discrete refractive lenses to provide various types of aberration correction, focusing features, etc.

Figure 6A:
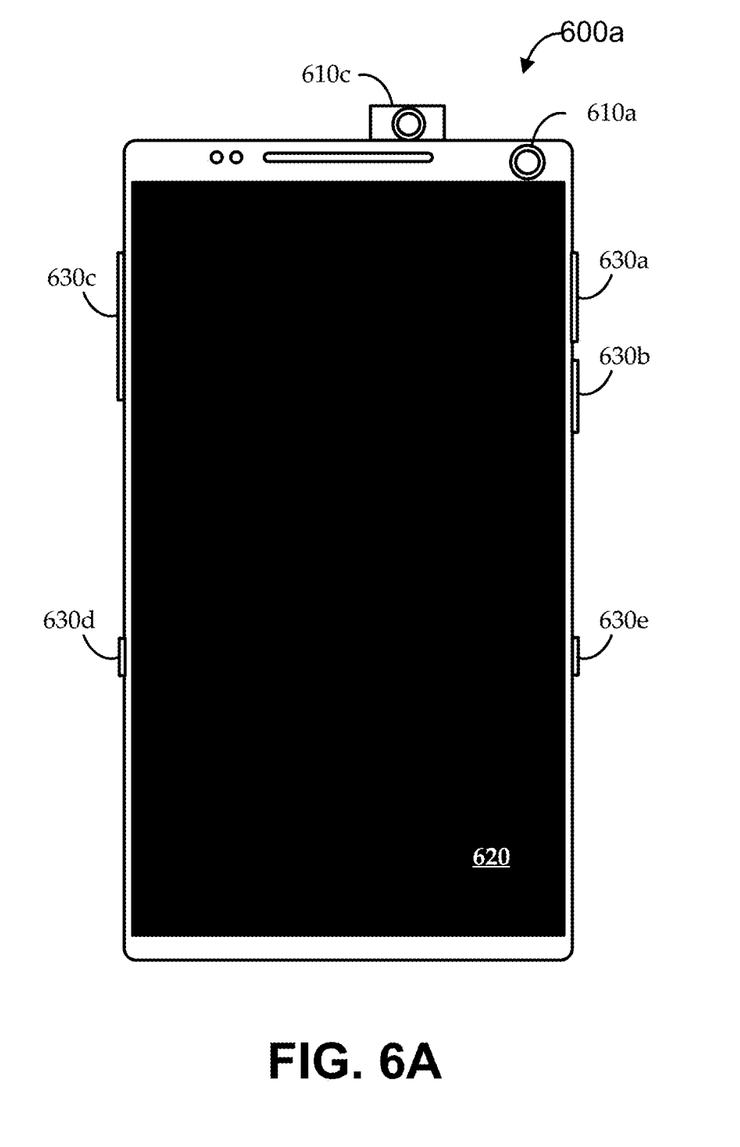
FIGS. 6A and 6B show front and side views, respectively, of an illustrative portable personal electronic device (PPED), according to various embodiments.
Figure 6B:
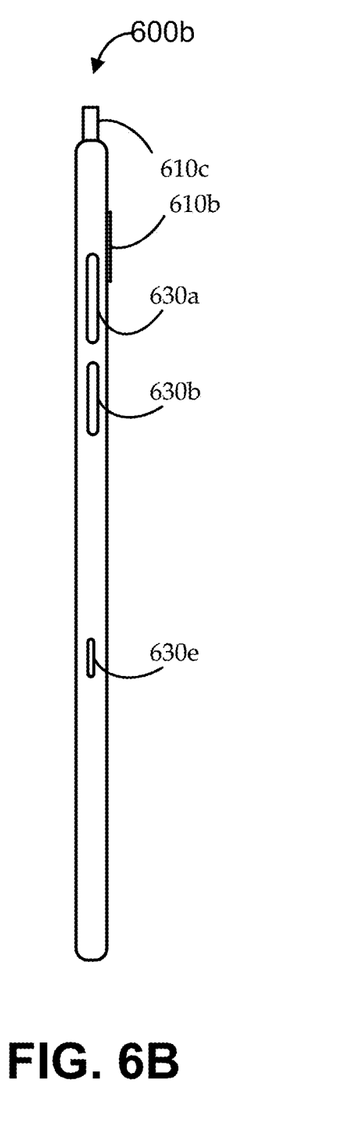

FIGS. 6A and 6B show front and side views, respectively, of an illustrative portable personal electronic device (PPED) 600, according to various embodiments. As used herein, a PPED can include a smartphone, tablet computer, laptop computer, smart wearable device (e.g., a smartwatch), or any other suitable device that has one or more integrated digital imaging systems 610. Embodiments of the PPED 600 can also include one or more displays 620. Though not explicitly shown, some embodiments of the display 620 can have, integrated therewith, capacitive touchscreen elements, another digital imaging system 610, a fingerprint sensor, and/or other components. User interface components can also include one or more physical buttons 630. For example, the physical buttons 630 can include a power button, volume buttons, etc. In some implementations, one or more of the buttons is dedicated to a particular function, and one or more of the buttons is dynamically assignable (e.g., by an application processor and/or other components) to various functions. Though not shown, the PPED 600 can include additional user interface components, such as optical sensors, force sensors, biometric sensors, accelerometers, etc.

Some or all of the digital imaging systems 610 can include a camera and a TOF sensor. The TOF sensor(s) are configured to support capturing of depth information to support three-dimensional features of the camera(s). For example, as illustrated, the PPED 600 can include a front-facing (e.g., selfie) digital imaging system 610a, a rear-facing digital imaging system 610b (shown in FIG. 6B), a pop-out digital imaging system 610c, and/or any other suitable integrated digital imaging systems 610. For example, a user desires to capture an image using one of the digital imaging systems 610. The PPED 600 initializes various hardware and software elements to enter an image acquisition mode. As part of the mode, one or more TOF sensors is used to project illumination and receive reflected optical information in response to the projected illumination. As described herein, the reflected optical information is received via various optics and sensors, including a hybrid refractive GRIN lens.

Figure 7:
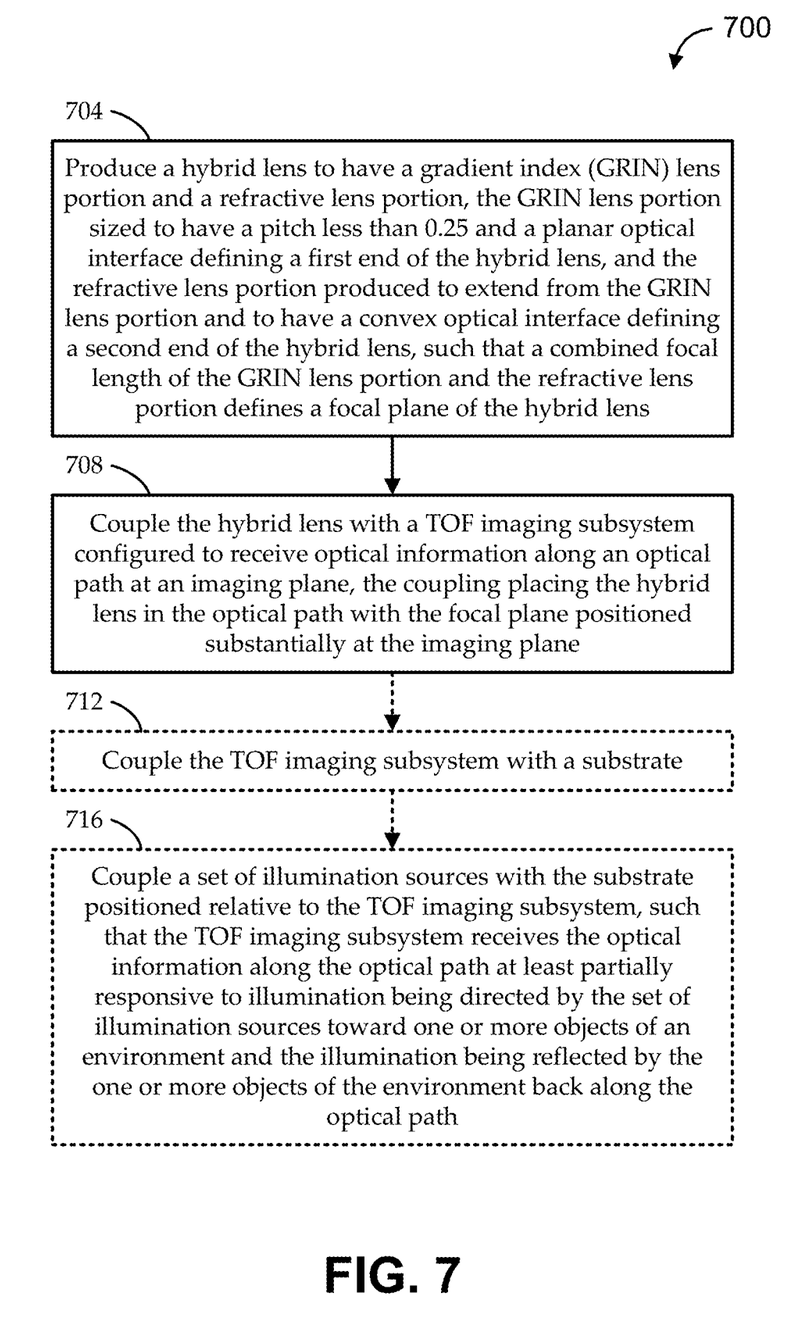
FIG. 7 shows a flow diagram of a method for producing a time-of-fly (TOF) sensor system, according to various embodiments.

FIG. 7 shows a flow diagram of a method 700 for producing a time-of-fly (TOF) sensor system, according to various embodiments. Some embodiments of the method 700 produce a TOF sensor in accordance with the descriptions above. The method 700 can begin at stage 704 by producing a hybrid lens to have a gradient index (GRIN) lens portion and a refractive lens portion. The GRIN lens portion is sized to have a pitch less than 0.25 (i.e., it is less than quarter-pitch) and a planar optical interface defining a first end of the hybrid lens. The refractive lens portion is produced to extend from the GRIN lens portion and to have a convex optical interface defining a second end of the hybrid lens. A combined focal length of the GRIN lens portion and the refractive lens portion defines a focal plane of the hybrid lens. In some embodiments, the planar optical interface (of the GRIN lens portion) is a first planar optical interface, and producing the GRIN lens portion by shaping a cylindrical GRIN material to form a discrete GRIN lens extending from the first planar optical interface to a second planar optical interface. For example, the GRIN lens portion is formed by cutting a length of cylindrical GRIN lens material to a desired length. In such embodiments, the refractive lens portion can be obtained as a discrete refractive lens extending from a third planar optical interface to the convex optical interface (e.g., a half-convex lens), and the hybrid lens is produced at stage 704 by affixing the second planar optical interface to the third planar optical interface to form the hybrid lens. In other embodiments, producing the hybrid lens at stage 704 includes shaping a unitary cylindrical GRIN material to have the planar optical interface at a first extent and to have the convex optical interface at a second extent.

At stage 708, embodiments can couple the hybrid lens with a TOF imaging subsystem configured to receive optical information along an optical path at an imaging plane. The coupling can involve placing the hybrid lens in the optical path with the focal plane positioned substantially at the imaging plane. In some embodiments, the coupling involves orienting the hybrid lens so that the refractive lens portion is pointing toward the imaging plane. In other embodiments, the coupling involves orienting the hybrid lens so that the refractive lens portion is pointing away from the imaging plane. In some embodiments, coupling the hybrid lens with the TOF imaging subsystem at stage 708 includes coupling a lens pad with the hybrid lens positioned in the optical path, the lens pad configured to influence light propagation along the optical path.

Some embodiments of the method 00 continue at stage 712 by coupling the TOF imaging subsystem with a substrate. For example, the substrate can be a circuit board and may include other circuits, connectors, etc. At stage 716, embodiments can couple a set of (i.e., one or more) illumination sources with the substrate positioned relative to the TOF imaging subsystem. The positioning can be, such that the TOF imaging subsystem receives the optical information along the optical path at least partially responsive to illumination being directed by the set of illumination sources toward one or more objects of an environment and the illumination being reflected by the one or more objects of the environment back along the optical path.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A time-of-fly (TOF) sensor system comprising:
  a TOF imaging subsystem configured to receive optical information along an optical path at an imaging plane;
  a hybrid lens coupled with the TOF imaging subsystem and disposed in the optical path so that the imaging plane is substantially at a focal plane of the hybrid lens, the hybrid lens comprising:
    a gradient index (GRIN) lens portion sized to have a pitch less than 0.25 and having a planar optical interface at a first end of the hybrid lens; and
    a refractive lens portion extending from the GRIN lens portion and having a convex optical interface at a second end of the hybrid lens, the refractive lens portion configured so that a combined focal length of the GRIN lens portion and the refractive lens portion defines the focal plane.

2. The TOF system of claim 1, wherein the combined focal length of the GRIN lens portion and the refractive lens portion is less than a quarter-pitch focal length of the GRIN lens portion.

3. The TOF system of claim 1, wherein:
the GRIN lens portion contributes a negative spherical aberration of magnitude |S1| to the optical path; and
the refractive lens portion contributes a positive spherical aberration of magnitude |S2| to the optical path,
such that the hybrid lens contributes a total spherical aberration of magnitude |ST| to the optical path, |ST| being smaller than both |S1| and |S2|.

4. The TOF system of claim 3, wherein |ST| is substantially zero.

5. The TOF system of claim 1, wherein:
the GRIN lens portion has a first focal length; and
the refractive lens portion is configured to have a second focal length that is substantially equal to the first focal length.

6. The TOF system of claim 1, wherein:
the planar optical interface is a first planar optical interface;
the GRIN lens portion is a discrete GRIN lens extending from the first planar optical interface to a second planar optical interface;
the refractive lens portion is a discrete refractive lens extending from a third planar optical interface to the convex optical interface; and
the hybrid lens is formed by coupling the second planar optical interface to the third planar optical interface.

7. The TOF system of claim 1, wherein the hybrid lens is formed from a unitary cylindrical GRIN material by shaping a first extent to form the planar optical interface and shaping a second extent to form the convex optical interface.

8. The TOF system of claim 1, wherein the hybrid lens is oriented in the optical path with the first end facing the imaging plane.

9. The TOF system of claim 1, wherein the hybrid lens is oriented in the optical path with the second end facing the imaging plane.

10. The TOF system of claim 1, wherein the hybrid lens is positioned so that one of the first end or the second end is in direct contact with the imaging plane.

11. The TOF system of claim 1, further comprising:
a lens pad coupled with the hybrid lens, positioned in the optical path, and configured to influence light propagation along the optical path.

12. The TOF system of claim 1, wherein the imaging plane comprises an array of photodetector elements.

13. The TOF system of claim 1, further comprising:
a TOF illumination subsystem configured to direct illumination toward one or more objects of an environment, such that the TOF imaging subsystem is configured to receive the optical information along the optical path at least partially responsive to the illumination being reflected by the one or more objects of the environment.

14. The TOF system of claim 13, further comprising:
a substrate having, mounted thereon, the TOF imaging subsystem and the TOF illumination subsystem.

15. A portable electronic device having a camera system and having the TOF system of claim 1 integrated therein, the TOF system configured to provide depth mapping information to the camera system.

16. A method for producing a time-of-fly (TOF) sensor system, the method comprising:
producing a hybrid lens to have a gradient index (GRIN) lens portion and a refractive lens portion, the GRIN lens portion sized to have a pitch less than 0.25 and a planar optical interface defining a first end of the hybrid lens, and the refractive lens portion produced to extend from the GRIN lens portion and to have a convex optical interface defining a second end of the hybrid lens, such that a combined focal length of the GRIN lens portion and the refractive lens portion defines a focal plane of the hybrid lens; and
coupling the hybrid lens with a TOF imaging subsystem configured to receive optical information along an optical path at an imaging plane, the coupling placing the hybrid lens in the optical path with the focal plane positioned substantially at the imaging plane.

17. The method of claim 16, wherein coupling the hybrid lens with the TOF imaging subsystem comprises coupling a lens pad with the hybrid lens positioned in the optical path, the lens pad configured to influence light propagation along the optical path.

18. The method of claim 16, wherein:
the planar optical interface is a first planar optical interface; and
producing the hybrid lens comprises:
producing the GRIN lens portion by shaping a cylindrical GRIN material to form a discrete GRIN lens extending from the first planar optical interface to a second planar optical interface; and
obtaining refractive lens portion as a discrete refractive lens extending from a third planar optical interface to the convex optical interface; and
affixing the second planar optical interface to the third planar optical interface to form the hybrid lens.

19. The method of claim 16, wherein producing the hybrid lens comprises shaping a unitary cylindrical GRIN material to have the planar optical interface at a first extent and to have the convex optical interface at a second extent.

20. The method of claim 16, further comprising:
coupling the TOF imaging subsystem with a substrate; and
coupling a set of illumination sources with the substrate positioned relative to the TOF imaging subsystem, such that the TOF imaging subsystem receives the optical information along the optical path at least partially responsive to illumination being directed by the set of illumination sources toward one or more objects of an environment and the illumination being reflected by the one or more objects of the environment back along the optical path.

* * * * *